(No Model.)
D. L. WHITTINGHAM.
VALVE.
No. 484,384. Patented Oct. 11, 1892.
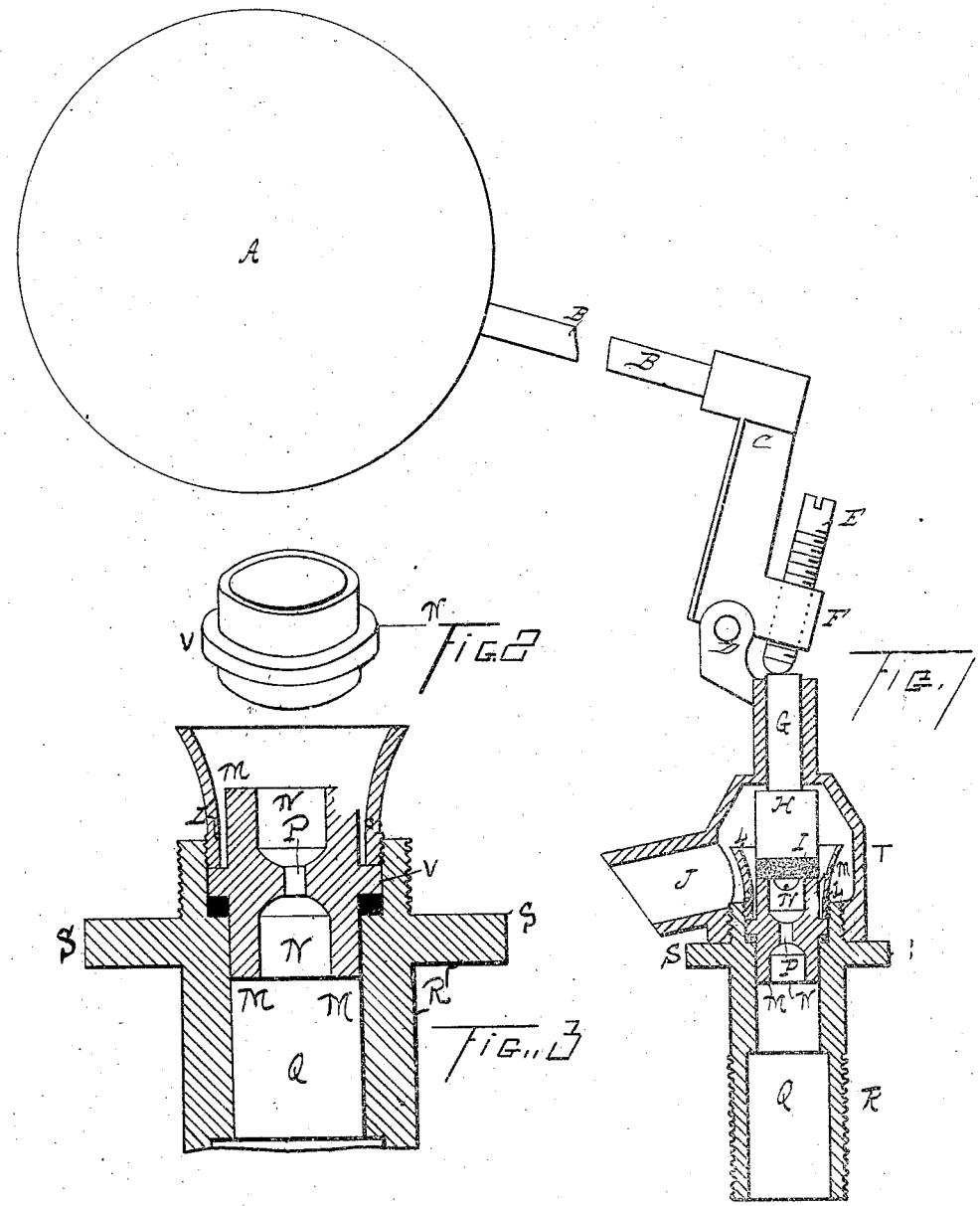
Witnesses
Gertrude H. Anderson
Geo. H. Lothrop
Inventor
David L. Whittingham

UNITED STATES PATENT OFFICE.

DAVID L. WHITTINGHAM, OF DETROIT, MICHIGAN, ASSIGNOR TO THE IDEAL MANUFACTURING COMPANY, OF MICHIGAN.

VALVE.

SPECIFICATION forming part of Letters Patent No. 484,384, dated October 11, 1892.

Application filed March 28, 1892. Serial No. 426,818. (No model.)

*To all whom it may concern:*

Be it known that I, DAVID L. WHITTINGHAM, of Detroit, in the county of Wayne and State of Michigan, have invented a new and useful Improvement in Valves, of which the following is a specification.

My invention consists in an improvement in valves hereinafter fully described and claimed.

Figure 1 is a vertical section through the valve. Fig. 2 is a perspective of the reversible valve-seat, and Fig. 3 is an enlarged vertical section through a portion of the valve.

The valve is one which is intended for use in tanks to be controlled by a float A.

Q represents an inlet water-pipe screw-threaded, as shown at R, and intended to pass through the bottom of a flushing-tank, the tank being gripped between the shoulder S and a nut on the screw-threaded portion R.

T represents the shell or case of the valve, which screws onto the upper end of pipe Q, and is provided with any suitable outlet or outlets, as J, and is adapted to hold and guide the stem G of the valve H, ordinarily provided with a packing or washer I, as shown in Fig. 1.

C and F represent a bell-crank lever pivoted at D to a bracket on the casing T.

B represents a float-lever secured to arm C, and E represents an adjusting-screw threaded through arm F and adapted to bear on the upper end of valve-stem G.

N represents a valve-seat, which is provided with a central collar V and two seats M M, as clearly shown in Fig. 2, whereby the valve-seat N is reversible, and either end may be used. The valve-seat N is inserted in place by being dropped down into the upper end of pipe Q, a gasket being placed between the shoulder V and a shoulder formed in said pipe, as shown in Figs. 1 and 3, and is there held in place by a ring L, which screws into pipe Q above shoulder V. For very heavy pressures the water-way through the valve-seat may be reduced, as shown at P.

When a float-valve is used on a very heavy pressure, the water issuing between the end M of the valve-seat and the washer I is thrown out with considerable force and makes considerable noise. To obviate this, I make the ring L to extend up above the end M of valve-seat N to break the flow of the water and conduct it up into shell T, and find that it is also advantageous to make it flaring, as shown in the drawings, thus breaking the force of the water and causing it to flow into the tank with comparatively little noise. With this improvement when one end M of valve-seat N becomes worn the whole valve-seat can be removed by unscrewing shell T and ring L, the valve-seat lifted out, the gasket transferred to the other side of shoulder V, the valve-seat dropped in place, or a new valve-seat may be introduced as above described, thus obviating the necessity of regrinding or throwing away the whole valve.

What I claim as my invention, and desire to secure by Letters Patent, is—

1. A valve having a double-ended valve-seat provided with a shoulder for packing, a chamber in the inlet-pipe to receive the shoulder of the valve-seat, and a screw-threaded ring engaging with the walls of said chamber above the shoulder on the valve-seat, whereby the valve-seat is removably held in position, substantially as shown and described.

2. In an inlet-valve for flushing tanks, the combination, with the valve, valve-seat, and casing having an outlet-hole, of a ring surrounding and extending above the valve-seat, substantially as shown and described.

DAVID L. WHITTINGHAM.

Witnesses:
GERTRUDE H. ANDERSON,
GEO. H. LOTHROP.